United States Patent [19]

Novack et al.

[11] 3,859,268

[45] Jan. 7, 1975

[54] CONTINUOUS MASS POLYMERIZATION OF POLY ALKENYL AROMATIC POLYMERS

[75] Inventors: Joseph Novack, Springfield, Mass.; Wallace G. Bir, Creve Coeur, Mo.

[73] Assignee: Monsanto Company, St. Louis, Mo.

[22] Filed: Mar. 9, 1973

[21] Appl. No.: 339,782

[52] U.S. Cl......... 260/88.2, 260/93.5 R, 260/93.5 S
[51] Int. Cl........... C08f 1/04, C08f 1/06, C08f 1/98
[58] Field of Search....................... 260/88.2 C, 93.5

[56] References Cited
UNITED STATES PATENTS

| | | | |
|---|---|---|---|
| 3,349,070 | 10/1967 | Thayer............................... | 260/93.5 |
| 3,451,986 | 6/1969 | Metais............................ | 260/93.5 |
| 3,639,372 | 2/1972 | Haynes et al................... | 260/93.5 S |
| 3,679,651 | 7/1972 | Kii et al....................... | 260/93.5 S |

Primary Examiner—Joseph L. Schufer
Assistant Examiner—A. L. Clingman
Attorney, Agent, or Firm—Joseph S. Nelson; Edward P. Grattan; James C. Logomasini

[57] ABSTRACT

A continuous mass polymerization process for making polyalkenyl aromatic polymers having a weight average molecular weight within the range of from about 20,000 to 100,000 and having a dispersion index of from 2.0 to 4.0 involves the use of an initial reaction zone and a final reaction zone operated continuously in series at variable fillages in each reaction zone. The process affords broad flexibility in polymers produced and production rates.

12 Claims, 2 Drawing Figures

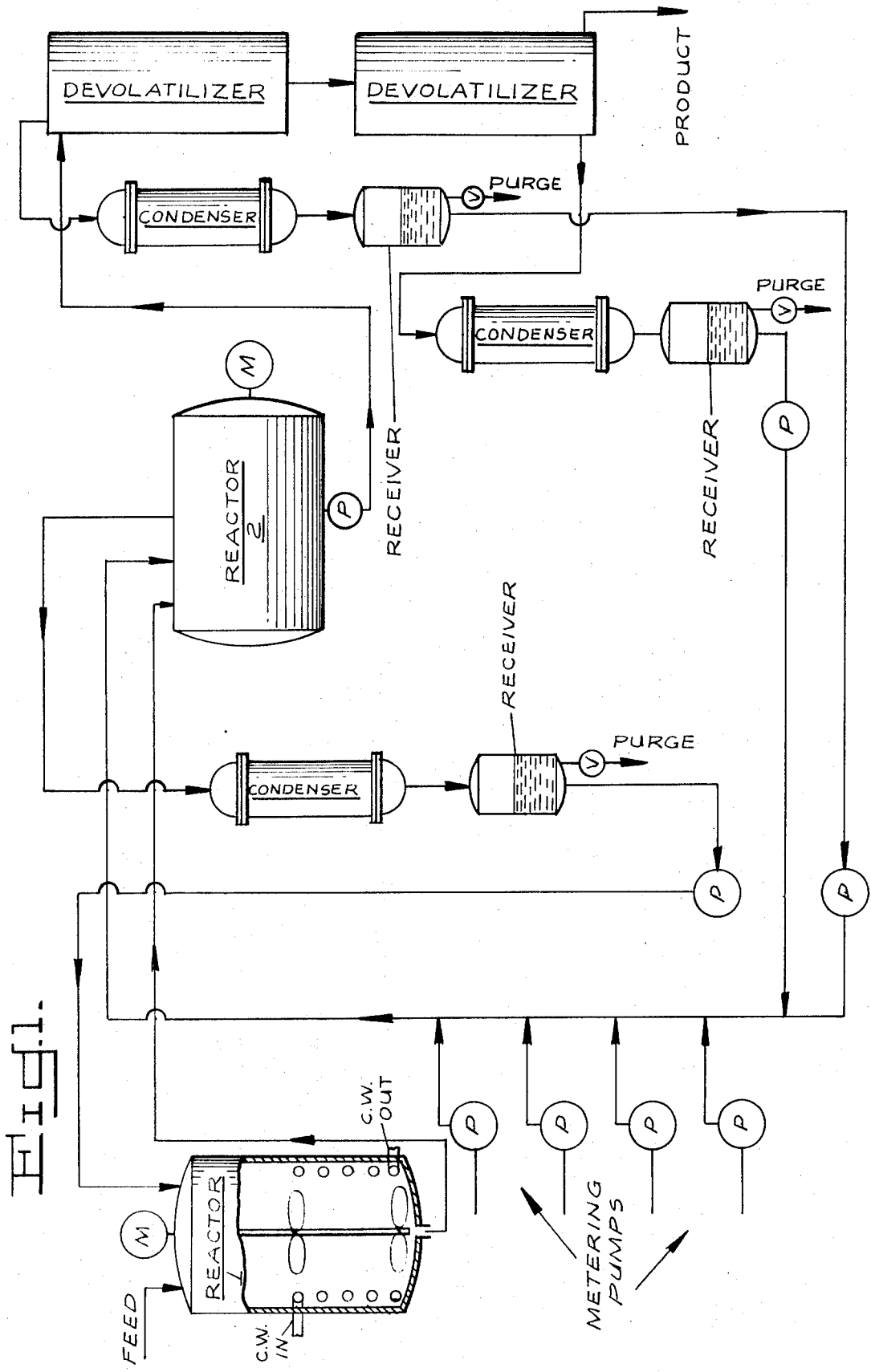

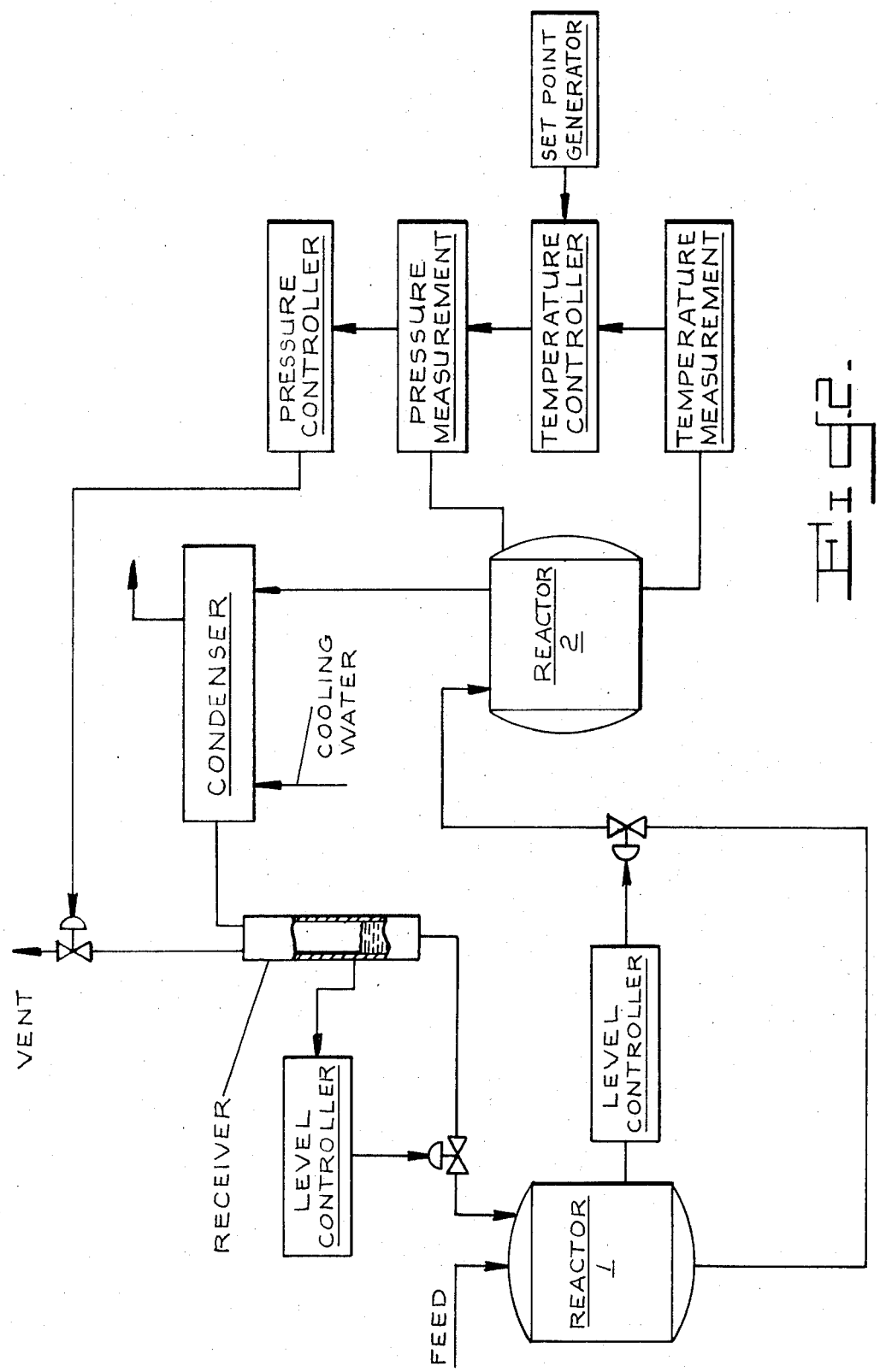

CONTINUOUS MASS POLYMERIZATION OF POLY ALKENYL AROMATIC POLYMERS

BACKGROUND

The art of styrene polymerization has long appreciated that polystyrene and like alkenyl aromatic polymers having a substantially narrow molecular weight distribution is highly advantageous for many applications, especially those involving injection molding applications. Likewise, the art has developed several high volume commercial molding products which require a relatively wide molecular weight distribution, sometimes having their viscosities at molding temperatures further modified by the inclusion of internal lubricants, mold release agents and the like. Both these types of polystyrene products for molding applications have enjoyed wide commercial acceptance and extensive sales.

In the past it has been the practice to produce these very different products in separate batch reactions or, in the case of the polymers having a relatively wide molecular weight distribution, in a separate continuous mass polymerization reaction process. However, the prior art has not possessed a continuous mass polymerization process which, on the same process line and with the same production equipment, could produce both polystyrene of a narrow molecular weight distribution and polystyrene having substantially different properties of relatively wide molecular weight distribution.

There has now been discovered, however, a process by which one can make by continuous mass polymerization techniques polystyrenes of uniform average molecular weight distribution as well as those polystyrenes of relatively wide molecular weight distribution. Such a continuous mass polymerization process can be carried out on the same processing line with the same production equipment, the polystyrenes of varied average molecular weight and physical properties and the production rates thereof being determined by setting and maintaining specific reaction conditions and flow rates in the process.

Thus the new continuous mass polymerization process of the present invention affords remarkable flexibility in the ability to produce multiple types of polyalkenyl aromatic polymers of varied physical properties with no changes in production equipment or processing line arrangement and piping required. Furthermore, this new mass polymerization process affords a similar flexibility in capacity for production of the polyalkenyl aromatic polymers which can be rapidly adapted to changes in market demand for the various polymers. The significant economies thus realized in the design, construction and operation of a production line for such polyalkenyl aromatic polymers make the present process distinctly advantageous for use by the industry.

SUMMARY

The present invention is directed to an improved continuous mass polymerization process for making polyalkenyl aromatic polymers. These polymers are made with molecular weights in the range from about 20,000 to 100,000 Staudinger and have a dispersion index (weight average molecular weight/number average molecular weight) in the range from about 2.0 to 4.0. Wherever in this application a Staudinger molecular weight is expressed it relates to the weight average molecular weight determined by the method of Staudinger from specific viscosity measurement as described at page 327 of "Styrene, Its Polymers, Copolymers and Derivatives" by Boundy and Boyer, Reinhold Publishing Corporation, New York, 1952. The process involves simultaneously practicing a plurality of steps.

One step involves charging a monomer composition comprising at least one monoalkenyl aromatic compound of the formula

where Ar is selected from the group consisting of a phenyl radical and a halophenyl radical and X is selected from the group consisting of hydrogen and an alkyl radical containing less than three carbon atoms to an initial continuous stirred reaction zone.

Another step involves maintaining reaction conditions in said initial continuous stirred reaction zone filled to from 10 to 100% of its volume with a liquid phase mixture of said monomer composition and polymer thereof such as to produce a polymer of from 20,000 to 100,000 Staudinger and a solids concentration of said polymer of between 10 and 60%. A further step involves withdrawing from said initial continuous stirred reaction zone a liquid mixture of said polyalkenyl aromatic polymer and unreacted alkenyl aromatic monomer composition. A still further step involves charging said withdrawn polymer and monomer mixture to a final reaction zone, which final reaction zone is a continuous stirred reaction zone adapted for variable fillage with said charged polymer and monomer mixture in liquid phase. A still further step involves maintaining reaction conditions in said final reaction zone such as to produce a polymer of from 20,000 to 100,000 Staudinger at an increased solids level of polymer of from about 40 to about 90% when said final reaction zone is filled to from about 15 to about 75% by volume with liquid phase mixture of said monomer composition and said polymer and the remainder of the volume of said zone occupied by vapor phase monomer composition.

A still further step involves charging of monomer composition to said initial reaction zone at a rate approximating the total rate at which monomer is polymerized and removed from said initial reaction zone.

A still further step involves removing said liquid phase from said final reaction zone at a rate sufficient both to maintain said vapor and liquid phase monomer composition therein and liquid volume and approximating the total rate at which all additions of liquid, including said mixture of polymer and monomer, are charged to said final reaction zone.

Preferably, the process of this invention is practiced using styrene monomer as the monomer composition. Alternatively, the process of this invention is practiced using a composition comprising at least about 90 weight percent styrene with a balance thereof being alphyl-methyl styrene.

Preferably also the process of this invention is practiced so that the liquid phase in the initial reaction zone comprises from about 35 to 50 weight percent polystyrene and in the final reaction zone comprises from about 45 to about 85 weight percent polystyrene with the balance of up to about 100 weight percent thereof being styrene monomer. Preferably in the products produced by the practice of this invention the dispersion index ($M_w/M_n$) ranges from about 2.2 to 3.5 and the polymer molecular weight ranges from about 40,000 to 68,000 Staudinger.

DRAWINGS

The present invention may be better understood by reference to the attached drawings wherein:

FIG. 1 is a diagrammatic view of an apparatus assembly incorporating two variable fillage reactors suitable for the practice of the present invention into an embodiment of apparatus suitable for carrying out the present invention; and FIG. 2 is a diagrammatic view of one preferred method of control of two variable fillage reactors as employed in the present invention.

DETAILED DESCRIPTION

The process of the present invention involves the use of two variable fillage type stirred reactors for the polymerization of alkenyl aromatic monomers such as styrene to a wide variety of polymer molecular weight distributions and an equally wide range of production rates by the proper balancing of the conditions of polymerization and flow rates as between the initial and final reaction zones, represented in FIG. 1 by reactors 1 and 2. The initial reaction zone as represented by reactor 1 can comprise a continuous stirred tank reactor of any type adapted for variable fillage operation of from as low as 10% to 100% of the volume thereof for the production of high molecular weight polyalkenyl aromatic polymers of up to 60% solids concentration. This continuous stirred tank reactor may be either horizontal or vertical and may have provision for close control of the temperature therein by any desired means, including control by cooling jacket, internal cooling coils or by withdrawal of vaporized monomer followed by condensation thereof and return of the condensed monomer to the reaction zone. It will be apparent to those skilled in the art that this initial reaction zone can, if desired, be constituted by a plurality of continuous stirred tank reactors operated in series wherein in the first of such reactors the conversion to polymer is taken to from about 10 to 30% solids concentration and in the second where, for example, the solids concentration is raised to from about 25 to 60%. Likewise, it will be apparent that such initial reaction zone can comprise more than one continuous stirred tank reactor operated in parallel if it is desired to employ several relatively small reactors to supply the capacity of the final reaction zone rather than a single large reactor for that purpose.

A preferred form of continuous stirred reactor which has been found quite suitable for carrying out the process is that general type illustrated in FIG. 1 wherein a tank reactor is provided with internal cooling coils sufficient to remove any heat of polymerization not taken up by raising the temperature of the continuously charged monomer composition so as to maintain a preselected desired temperature for polymerization therein. Preferably also, such continuously stirred tank reactor will be provided with at least one and usually more vaned agitators driven by an external power source such as the motor indicated by the symbol M in FIG. 1. At least one of such agitators is positioned to provide agitation to liquid contained in the reactor while operating at minimum fillage, i.e., as low as 10% of the volume thereof. Such a continuous stirred tank reactor can, if desired, be provided with additional features for improved efficiency of operation and safety, such as an additional series of internal cooling coils adapted to effectively prevent any "run-away" polymerizations if the normal holding period has to be extended for some reason and an outer jacket for additional cooling or heating of the contents of the reactor. A particularly preferred form of reactor comprising the initial reaction zone is that reactor apparatus disclosed in copending application Ser. No. 339,781 of Wallace G. Bir, filed of even date herewith.

The final reaction zone comprising a part of the present process can comprise a continuous stirred reaction zone adapted for variable fillage of from at least 15 to 75% of the total volume thereof and for the production of high molecular weight polyalkenyl aromatic polymer compositions which are very highly viscous fluids of from about 40% to as high as 90% by weight solids concentration in a mixture of high polymers and alkenyl aromatic monomer. This second reaction zone can comprise reactors of several types as well. For example, such reactors can be either horizontal or vertical and comprise double helical rotor agitated vessels, partially compartmented vessels wherein polymers of increasing molecular weight are forwarded from the entry to exit portion thereof or reactors with one or more driven agitators adapted for fully homogenous mixing of the very high viscosity liquid mixture of polymer and monomer therein. But all of such continuous stirred reactors however must be adapted for very close control of the temperature and/or pressure therein to provide for the production of the desired homopolymers and copolymers of relatively narrow molecular weight distribution.

A particularly preferred form of the final reaction zone as represented by reactor 2 in FIG. 1 are those horizontal continuous stirred reactors whose internal temperature and/or pressure can be very closely controlled by means of withdrawal of the vapor phase of alkenyl aromatic monomer present above the liquid phase therein. Such manner of control by increased or decreased withdrawal of the vapor phase has been found to provide very accurate and responsive control of the polymerization temperature or pressure, in a continuously agitated reaction zone for the production of high molecular weight polymers in a viscous liquid mixture with monomers. A most preferred form of the final reaction zone as represented by reactor 2 is that form of a horizontal continuous stirred reactor producing homogenous isothermal mixing of charged liquid phase polymer and monomer at any fillage of from 15% to 90% of the volume thereof disclosed in copending application Ser. No. 172,145 filed Aug. 16, 1971 of George A. Latinen, now U.S. Pat. No. 3,794,471.

In operation of the present improved continuous mass polymerization process great flexibility and range of choice can be realized in polymer types produced as well as the production rate thereof by proper choice of polymerization reaction conditions in both the initial and final reaction zones when continuously operated together. FIG. 1 illustrates the operation of the initial and final reaction zones of the present process and the manner in which such operation is incorporated into an overall polyalkenyl aromatic polymer production line. In operation a monomer composition comprising polyalkenyl aromatic monomers as described above, and preferably styrene monomer, is charged to reactor 1 and the temperature thereof raised to from 120° to 180° C to produce thermal polymerization thereof. Pressure in reactor 1 can vary from 15 to 150 psia or even higher. It is preferred to operate reactor 1 at from about 20 to about 75 psia, and most preferably from about 35 to about 50 psia. At the latter pressures transfer of the liquid mixture of polymer and monomer to further reaction processing zones can be achieved without the need for a pump so long as the pressure in reactor 1 exceeds the pressure in reactor 2 and the transfer lines thereto. Hence, this is the most desired means of operation of this initial reaction zone.

After the initial fillage of reactor 1 to the desired preselected level and polymerizing the charged monomer to approximately the desired solids content, then the volume of monomer composition charged thereto is adjusted to a value to maintain such preselected level of liquid in reactor 1. Thereafter the liquid mixture of polymer and monomer is withdrawn from reactor 1, to maintain the preselected level of such liquid mixture in the initial reaction zone. Polymerization conditions are continuously maintained in reactor 1 to produce a polymer of selected molecular weight and selected degree of conversion or weight percent solids of polymer in such liquid mixture. The initial reaction zone can be operated so as to produce a liquid mixture with a polymer concentration or percent solids from as low as 10 percent to as high as 60 percent by weight and such polymer can possess an average molecular weight ranging from 20,000 to 100,000 Staudinger. The level of fillage of reactor 1 can vary from as low as 10 percent to as high as 100 percent, or completely filled, and may be controlled by any desired means, for example the level controller and associated valve in the transfer line from reactor 1 as shown in FIG. 2.

Any desired means of controlling the temperature within reactor 1 may be employed. It is preferred that the temperature be controlled by circulation of a cooling fluid such as cooling water through internal cooling coils in those reactors so equipped such as reactors of the type illustrated in FIG. 1. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight.

As the polymer concentration progresses the polymerization rate decreases and the possibility of damage from "run-away" reactions is substantially reduced. In general it is preferred to produce in the initial reaction zone a solids content of from 35 to 50 percent by weight of a polymer of relatively high average molecular weight of from about 50,000 to 100,000 Staud. and of relatively narrow molecular weight distribution. The holdup period in the initial reaction zone can vary from about 1 to 10 hours.

To commence operation of the process both reactor 1 and reactor 2 are filled to the desired level with monomer, brought to the desired polymerization temperature and polymerization is conducted with stirring until the desired degree of conversion is reached, i.e., until the liquid mixture of monomer and polymer reaches the desired percent solids content. Following the establishment of steady polymerization conditions there is initiated the continuous withdrawal of liquid mixture of polymer and monomer from reactor 1 by means of pumps of the gear or other type, or preferably, by virtue of the pressure maintained in the initial reaction zone as described above. This liquid mixture of monomer and polymer is then transferred and charged to the final reaction zone as represented by reactor 2 in FIG. 1. This final reaction zone is operated at a temperature of from 130° to 180° C and at the same or lower pressures than the initial reaction zone. Therein the alkenyl aromatic monomer composition is further polymerized in the form of additional polymer to a higher percent solids content. The same, or preferably, a somewhat higher temperature is selected and maintained in the final reaction zone to produce this desired further polymerization. The holdup period in the final reaction zone can vary from about ¼ hour to 5 hours.

This final reaction zone can take the form of a variable fillage continuously stirred reactor wherein either a fixed temperature and/or a fixed pressure can be maintained, as discussed in further detail below. In operation the final reaction zone which can be filled from about 15 to 75% of its volume with a liquid mixture of monomer and polymer, the remaining volume thereof being occupied by vaporized monomers, can be operated to produce a liquid mixture of high molecular weight polymer and monomer wherein the degree of conversion to polymer or solids content can range from about 40% to as high as 90% solids by weight. The conditions of temperature and pressure as well as the addition of further quantities of monomer to the second reaction zone can be adjusted so as to produce a mixture of polymers of a relatively lower average molecular weight than the polymer produced in the initial reaction zone, for example a polymer of an average molecular weight ranging from about 20,000 to about 55,000 Staud. On the other hand the conditions in the final reaction zone can be maintained so as to produce a mixture of polymers in the higher average molecular weight range, i.e., from about 55,000 to 100,000 Staud. such as generally produced in the initial reaction zone. This flexibility affords the ability to produce a wide range of polymers of varying average molecular weight distribution and at varying degrees of fill of both the initial and final reaction zones.

In the operation of the final reaction zone it is preferred to employ a continuous stirred reactor which is controlled by withdrawal of vaporized monomer composition above the liquid level maintained therein in order to control the temperature and/or pressure in such final reaction zone. This withdrawn stream of vaporized monomer is condensed in a condenser as shown, collected in a receiver and can be returned either to the initial reaction zone or the final reaction zone, depending upon the polymer selected to be produced by the process. In some instances, particularly when a polymer of relatively high molecular weight and relatively narrow molecular weight distribution is desired, it is preferred that the withdrawn and condensed monomer stream be recycled to the initial reaction zone as shown in FIG. 1. Such recycle of monomer serves to produce generally higher molecular weight polymers at shorter holdup times in the final reaction zone.

As indicated above the preferred type of reactor employed as the final reaction zone in the present process is a reactor which is adapted for control of temperature and/or pressure therein by means of withdrawal and recycle or reflux of a portion of the vapor phase of monomer above the liquid phase mixture of monomer and polymer in such reactor. Such a reactor can be operated at a somewhat lower range of pressure than the reactor comprising the initial reaction zone described above. Thus, in such a vapor phase controlled reactor the pressure maintained can vary from below to above that at the equilibrium boiling point of the specific mixture of monomers and polymers contained therein. In the instance of the polymers produced by the present invention, such a pressure can range from 5 to 20 psia. When operated below such equilibrium pressure the liquid phase present in the final reaction zone is expanded by the vaporization of monomer in such liquid phase to at least about 5% and preferably to at least about 10% over the volume of the liquid phase in a substantially non-expanded form, i.e., at a pressure somewhat above such equilibrium pressure at the same temperature.

Several means of control of the vaporized monomer stream withdrawn from the final reaction zone can be utilized. When control of the pressure to a preselected value in the reactor is desired such control can be obtained by sensing the pressure in the vapor phase within the reactor and employing a signal generated thereby to control a pressure controller modified by a signal generated by a set point generator operating at a preselected value and thereby controlling the pressure maintained in the monomer vapor phase above the condensed liquid in the monomer recycle receiver by means of a pressure controlled valve in the vent line from the upper portion of said receiver. Likewise when it is desired to control the temperature in such reactor at a preselected value the temperature in the liquid phase in the reactor is sensed, converted to a signal used to control a temperature controller likewise modified by a preselected set point signal and the resulting signal used to control a temperature control valve in the cooling water line to the associated condenser.

A preferred method of control of the final reaction zone such as reactor 2 is illustrated in FIG. 2 of the drawing. As illustrated, the variable controlled is the temperature within reactor 2. The control system shown involves sensing the temperature in the liquid phase and employing a signal so generated to control a temperature controller modified by a signal from a set point generator at a preselected temperature value. The resulting signal modified by a signal generated by sensing the pressure in the vapor phase of said reactor is employed to control a pressure controller which in turn controls a pressure valve in the vent line from the recycled condensed monomer receiver. By so adjusting the pressure above the condensed monomer in the receiver the temperature in reactor 2 is very closely and rapidly controlled to a preselected desired value. As shown in FIG. 2 the liquid level in the condensed monomer receiver is utilized to control the recycle rate of the liquid contents of said receiver to reactor 1 by means of the valve shown. Such recycle rate is controlled by the liquid level in the receiver which in turn is controlled by the rate of withdrawal of the vaporized monomer from reactor 2 controlled as above outlined.

The utilization of the present process in an overall production process for high molecular weight polyalkenyl aromatic polymers is shown in FIG. 1. The high molecular weight polymer and monomer mixture comprising the liquid phase in reactor 2 and having a solids content of from about 40% to about 90% by weight is withdrawn therefrom by suitable means such as a gear pump and passed to a devolatilization zone or zones.

In FIG. 1 there are illustrated two zones of devolatilization which can be operated at the same or different reduced pressures, or degree of vacuum. However, the process of the present invention can be operated by the use of a single or multiple zones of devolatilization as desired. In the process outlined the vaporized alkenyl aromatic monomers as well as low oligomers thereof are removed from the first devolatilization zone, condensed and passed to a receiver. From the receiver a stream of the condensed monomers and oligomers can be recycled to reactor 2 as shown, or, if preferred, to reactor 1. Likewise the monomers and oligomers vaporized in the second devolatilization zone generally operated at somewhat lower pressure than the first are withdrawn, condensed and passed to a receiver. From this receiver a stream of condensed monomers and oligomers can also be recycled to either reactor 1 or 2 as shown. Preferably, the oligomers vaporized in either devolatilization zone can be separated from the vaporized monomer prior to its condensation and separately recycled to a reaction zone or purged from the process.

In the production of certain of the desired polymers it has generally been found advantageous to add certain high boiling organic compounds to the polymers produced and the addition is preferably made during polymerization. These additives include internal lubricants such as mineral oil or other heavy oil and mold release agents such as fatty acids, fatty acid esters and waxes. These additions can be conveniently made to either reaction zone but are preferably made to reactor 2 as shown in FIG. 1 by means of the multiple metering pumps there shown. Making such additions to reactor 2 facilitates changing the polymer product mix without shutting down or cleaning reactor 1. In any event it is necessary for economic reasons to be able to recover the relatively high boiling additives and recycle them to the process. Such additives are generally recycled to either zone of reaction together with the oligomers in a stream of condensed monomer when such oligomers have been concentrated from the vaporized monomers or alternatively, with the condensed and recycled monomer streams. In the present process it is preferred that the oligomers and additives be concentrated in a stream of condensed monomer rich in oligomers and additives and that such stream be recycled to the final reaction zone while a separate stream of condensed monomer substantially free of oligomers and additives be recycled to the initial reaction zone from the devolatilization zone or zones.

When operating in the manner described above the proper control of an initial reaction zone and a final reaction zone both comprising reactors of the variable fillage type affords one the extremely useful advantage of ability to produce polymers of specific physical properties and molecular weight distribution over a range of capacities of from as low as 35% to as high as 100% of design capacity for the single production facility described. This flexibility in useful capacity is highly desirable to afford ready response to changes in market demand for total polymers or in the market percentage for various polymers produced in such a production facility.

The following examples are set forth to illustrate more clearly the principles and practice of this invention to one skilled in the art. They are not intended to be restrictive but merely illustrative of the invention herein described. All parts are parts by weight unless otherwise indicated. All molecular weights are in Staudinger values unless otherwise specifically noted.

EXAMPLE I

A vertical stirred tank reactor adapted for cooling by a cooling water jacket was filled to 46% of its volume with styrene monomer and brought to a polymerization temperature of approximately 140° C. Polymerization was begun with stirring and continued until the solids content of the liquid contents reached about 40% solids. Thereafter a continuous flow of 200 parts per hour of styrene monomer, including 12.5 parts per hour of condensed styrene monomer recycled from the second reactor was established to the first reactor. The temperature of the polymerizing liquid in the first reactor was maintained at approximately 140° C by circulating cooling water through the reactor jacket. A continuous withdrawal of the liquid mixture of polymer and monomer was established such as to maintain the initial level in reactor 1.

A second reactor of the horizontal continuous stirred type providing homogenous and isothermal mixing of the type described in copending application Ser. No. 172,145 filed Aug. 16, 1971 was filled with styrene monomer to 52% of its volume. The contents were brought to a temperature of 180° C and polymerization with agitation continued until the liquid phase reached a solids content of about 70%.

When steady state conditions had been reached in both reactors the flow of styrene monomer to and withdrawal of liquid mixture from the first reactor was established. From the first reactor there was withdrawn a continuous stream of mixed monomer and polymer of 40.3% solids content of polymer of an average molecular weight of 61,800 Staud. and a dispersion index of 2.1. This stream was continuously charged to the second reactor. The temperature in the second reactor was maintained at approximately 180° C by removal of approximately 12.5 parts per hour of vaporized monomer therefrom which was condensed and recycled to the first reactor via a receiver. In the second reactor a second polystyrene polymer was thus produced of an average molecular weight of 30,400 Staud. From the second reactor there was withdrawn a liquid mixture of both polymers and unreacted monomer at a rate of 187.5 parts per hour of 76% solids content wherein the average polymer molecular weight was approximately 48,000 Staud. and of a broad molecular weight distribution as indicated by a dispersion index of 2.8. This polymer and monomer mixture was directed to a devolatilization zone and the devolatilized polymer melt was stranded and pelleted. The resulting polystyrene was suitable for molding uses in which a polymer of broad molecular weight distribution is employed.

EXAMPLE II

The same vertical stirred tank reactor filled to 42% of its volume was brought to a steady state as described in Example I. Likewise the same horizontal stirred homogenous and isothermal reactor filled to 51% of its volume was brought to steady state at 150° C as described in Example I. When steady state conditions had been reached a continuous flow of 200 parts/hr. of styrene was begun to the first reactor including 31.7 parts per hour of condensed styrene monomer recycled from the second reactor. The first reactor was maintained at approximately 140° C by circulation of cooling water through the reactor jacket. From the first reactor there was withdrawn a sufficient quantity to maintain the level therein of a liquid stream of monomer and polymer of 35.3% solids in which the polystyrene had an average molecular weight of 61,800 Staud. and a dispersion index of 2.11. This stream was charged to the second reactor. The second reactor was maintained at approximately 150° C by the removal of 31.7 parts per hour of monomer vapor therefrom which was condensed and recycled to the first reactor via a receiver. Thus, there was produced in the second reactor an additional polystyrene polymer of an average molecular weight of 53,600 Staud. and a relatively narrow molecular weight distribution. There was withdrawn from the second reactor 168.3 parts per hour, a quantity to maintain the same liquid level in such reactor, of a mixture of both polymers and unreacted monomer of 69% solids, the polystyrene having an average molecular weight of 58,600 Staud. and a dispersion index of 2.26. This mixture was devolatilized in a devolatilization zone, stranded and pelleted as in Example I. The polystyrene product was found suitable for injection molding at rapid cycle rates in the same manner as other polystyrenes of a low dispersion index.

EXAMPLE III

The procedure of Example II is repeated using a monomer composition of 90 weight percent styrene and 10 weight percent alpha-methyl styrene. The mixture of polymers and unreacted monomers which is withdrawn from the second reactor is found to have a solids content of from about 65 to 70%, containing copolymer of an average molecular weight of from 50,000 to 65,000 Staud. and a dispersion index of from 2.2 to 2.5. This polystyrene copolymer is suitable for molding uses in the same manner as a polystyrene of similar molecular weight and dispersion index.

EXAMPLE IV

The procedure of Example II is repeated using a monomer composition of 95 weight percent styrene and 5 weight percent monochlorostyrene. The mixture of polymers and unreacted monomers which is withdrawn from the second reactor is found to have a solids content of from about 66 to 72%, containing a copolymer of an average molecular weight of from 50,000 to 65,000 Staud. and a dispersion index of from 2.2 to 2.5. This polystyrene copolymer is suitable for molding uses in the same manner as a polystyrene of similar molecular weight and dispersion index.

What is claimed is:

1. An improved continuous mass polymerization process for making polyalkenyl aromatic polymers having a molecular weight within the range of from about 20,000 to 100,000 Staudinger, and having a dispersion index of from about 2.0 to 4.0 which comprises the steps of continuously
    A. Charging to an initial continuous stirred reaction zone adapted for variable fillage a monomer composition comprising at least one monoalkenyl aromatic compound of the formula

where Ar is selected from the group consisting of a phenyl radical and a halophenyl radical and X is selected from the group consisting of hydrogen and an alkyl radical of less than three carbon atoms, B. Maintaining reaction conditions in said initial continuous stirred reaction zone filled to from 10 to 100% of its volume with liquid phase mixture of said monomer composition and polymer thereof such as to produce a polymer of 20,000 to 100,000 $MW_{St.}$ and a solids concentration of said polymer of between 10 and 60 percent, C. Withdrawing from said initial continuous stirred reaction zone a liquid mixture of said polyalkenyl aromatic polymer and unreacted alkenyl aromatic monomer composition, D. Charging said withdrawn polymer and monomer mixture to a final reaction zone, which final reaction zone is a continuous stirred reaction zone adapted for variable fillage with the said charged polymer and monomer mixture in liquid phase and in which the internal temperature or pressure is controlled by removal of vapor phase therefrom, E. Maintaining reaction conditions in said final reaction zone such as to produce a polymer of from 20,000 to 100,000 $MW_{St.}$ and of an increased solids level of polymer of from about 40 to about 90 percent when said final reaction zone is filled to from about 15 to about 75 percent of its volume with liquid phase mixture of said monomer composition and said polymer and the remainder of the volume of said zone occupied by vapor phase monomer composition, F. The charging of said monomer composition to said initial reaction zone being at a rate approximating the total rate at which monomer is polymerized and withdrawn from said initial reaction zone, and G. Removing said liquid phase from said final reaction zone at a rate sufficient both to maintain said vapor phase of monomer composition therein and approximating the total rate at which all additions of liquids are charged to said final reaction zone.

2. The process of claim 1 comprising the additional steps of continuously

H. Removing from said vapor phase in the final reaction zone vaporized monomer composition at a rate sufficient to maintain a preselected temperature of from about 130° to 180° C in said final reaction zone, and I. Condensing said vaporized monomer composition to a liquid and recycling said liquid monomer to a polymerization reaction zone.

3. The process of claim 2 wherein the vaporized monomer composition removed from the final reaction zone is condensed and recycled to said initial reaction zone.

4. The process of claim 1 wherein said reaction conditions in said initial reaction zone comprise a temperature of from about 130° to 180° C and a pressure of from 15 to 150 psia.

5. The process of claim 1 wherein said reaction conditions in said final reaction zone comprise a temperature of from about 130° to 180° C and a pressure of from 5 to 150 psia.

6. The process of claim 1 wherein said monomer composition comprises styrene.

7. The process of claim 1 wherein said monomer composition comprises at least about 90 weight percent styrene and up to about 10 weight percent alpha-methyl styrene.

8. An improved continuous mass polymerization process for making polyalkenyl aromatic polymers having a molecular weight within the range of from about 20,000 to 100,000 Staudinger and having a dispersion index of from about 2.0 to 4.0 which comprises the steps of continuously A. Charging to an initial continuous stirred reaction zone comprising a stirred tank reactor adapted for cooling by internal cooling coils a monomer composition comprising at least one monoalkenyl aromatic compound of the formula

where Ar is selected from the group consisting of a phenyl radical and a halophenyl radical and X is selected from the group consisting of hydrogen and an alkyl radical of less than three carbon atoms.

B. Maintaining reaction conditions in said initial continuous stirred reaction zone filled to from 10 to 100% of its volume with liquid phase mixture of said monomer composition and polymer thereof such as to produce a polymer of 20,000 to 100,000 Staudinger and of a solids concentration of said polymer of between 10 and 50 percent, said conditions comprising a temperature of from about 130° to 180° and a pressure of from 15 to 150 psia, C. Withdrawing from said initial reaction zone a liquid mixture of said polyalkenyl aromatic polymer and unreacted alkenyl aromatic monomer composition, D. Charging said withdrawn polymer and monomer mixture to a final reaction zone comprising a horizontal continuous stirred reaction zone adapted for variable fillage with the said charged polymer and monomer in liquid phase and in which the internal temperature is controlled by removal of vapor phase therefrom, E. Maintaining reaction conditions in said final reaction zone such as to produce a polymer of from 20,000 to 100,000 Staudinger and of an increased solids level of polymer of from about 45 to about 90 percent when said final reaction zone is filled to from about 15 to about 75 percent of its volume with said liquid phase mixture of said monomer composition and said polymer and the remainder of the volume of said zone occupied by vapor phase monomer composition, said reaction conditions comprising a temperature of from about 130° to 180°C and a pressure of from about 5 to 20 psia such that the volume of said liquid phase is expanded by the presence of vapor phase to at least about 5 percent greater than the volume of said liquid phase in substantially non-expanded form, F. The charging of said monomer composition to said initial reaction zone being at a rate approximating the total rate at which said monomer is polymerized and withdrawn from said initial reaction zone, G. Removing said liquid phase from said final reaction zone at a rate sufficient both to maintain said vapor phase of monomer composition therein and approximating the total rate at which all additions of liquids are charged to said final reaction zone, H. Removing from said vapor phase in the final reaction zone vaporized monomer composition at a rate sufficient to maintain a preselected temperature of from about 130° to 180°C in said final reaction zone, and I. Condensing said vaporized monomer composition to a liquid and recycling said liquid monomer to said initial reaction zone.

9. The process of claim 8 wherein the liquid phase removed from said final reaction zone comprises a polymer of from about 40,000 to 68,000 $MW_{St.}$ and a dispersion index of 2.2 to 3.5.

10. The process of claim 8 wherein said monomer composition comprises styrene.

11. The process of claim 8 wherein said monomer composition comprises at least about 90 weight percent styrene and up to about 10 weight percent alpha-methyl styrene.

12. The process of claim 8 wherein from a devolatilization zone a stream of condensed alkenyl aromatic monomer substantially free of oligomers and high boiling additives is recycled to said initial reaction zone and a separate stream of condensed alkenyl aromatic monomer rich in oligomers and high boiling additives is recycled to said final reaction zone.

* * * * *